United States Patent [19]
Willinger et al.

[11] 3,746,169
[45] July 17, 1973

[54] AQUARIUM FILTRATION DEVICE

[75] Inventors: Allan H. Willinger, Clifton, N.J.; Albert J. Dinnerstein, Far Rockaway, N.Y.

[73] Assignee: Metaframe Corporation, Maywood, N.J.

[22] Filed: Dec. 28, 1971

[21] Appl. No.: 213,060

[52] U.S. Cl. .................................. 210/87, 210/169
[51] Int. Cl. ........................ B01d 35/14, E04h 3/20
[58] Field of Search ........................ 210/169, 87, 97, 210/98, 103, 104, 129; 119/3, 29, 5; 116/117 R

[56] References Cited
UNITED STATES PATENTS

| | | | |
|---|---|---|---|
| 3,477,580 | 11/1969 | Willinger | 210/169 |
| 3,185,128 | 5/1965 | Moore et al. | 116/117 R |
| 3,507,253 | 4/1970 | Willinger | 119/5 |
| 2,786,026 | 3/1957 | Stark | 210/169 |
| 3,592,765 | 7/1971 | Rodrigues | 210/169 |
| 1,385,973 | 7/1921 | Brown | 116/117 R |
| 1,449,217 | 3/1923 | Davis | 116/117 R |
| 3,094,969 | 6/1963 | Whiting | 116/117 R |

*Primary Examiner*—Samih N. Zaharna
*Assistant Examiner*—T. A. Granger
*Attorney*—Abraham Friedman and Abraham Goodman

[57] ABSTRACT

An aquarium filtering device comprising a spherical housing divided into first and second chambers in communicating relation. The housing is provided with entrance and exit openings through which water may enter and exit the housing from an external water-carrying source. The second chamber includes a filtering assembly for cleansing water which has entered from the first chamber. An air conduit is provided for directing air into the second chamber and drawing water through the filtering assembly. A rotary indicator is provided for signalling visually the rate of inflow of water into the first chamber and outflow from the latter into the second chamber so as to guide adjustment and cleansing of the filtering device.

10 Claims, 10 Drawing Figures

Patented July 17, 1973

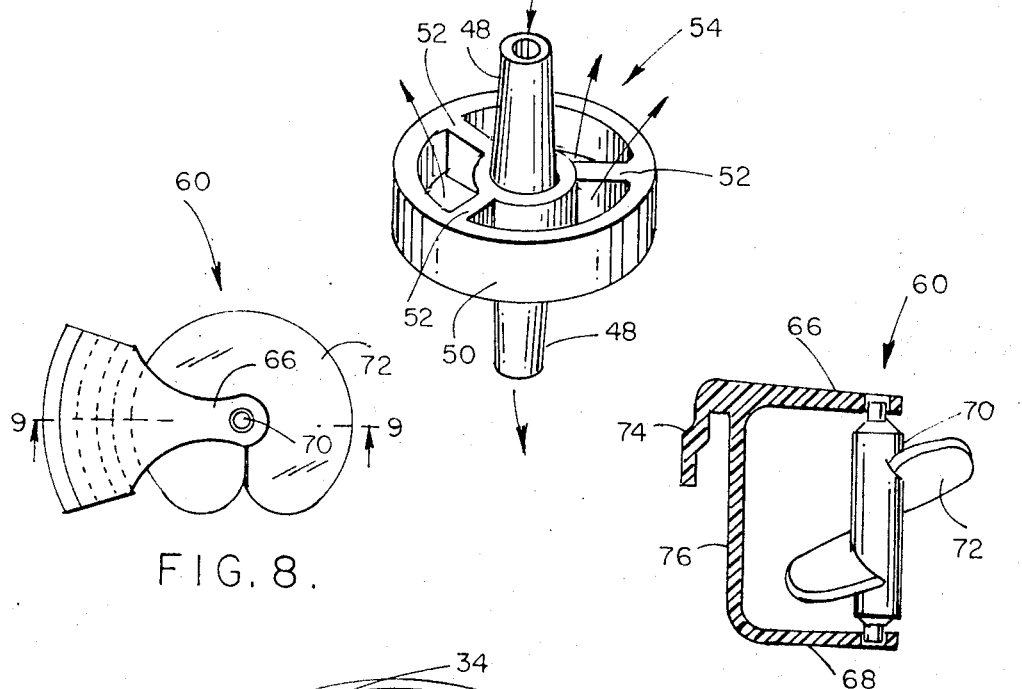
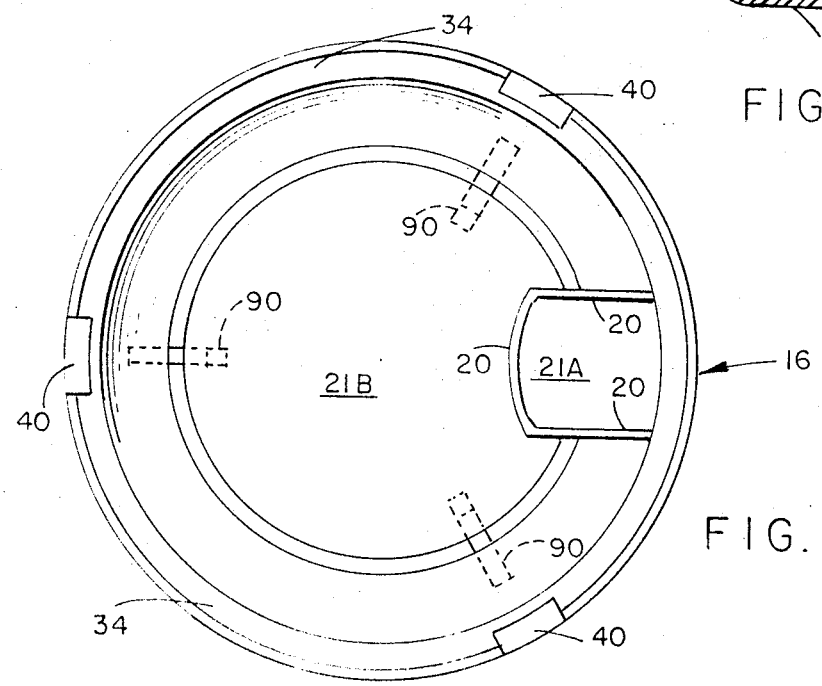

AQUARIUM FILTRATION DEVICE

BACKGROUND OF THE INVENTION

The present invention relates generally to an air operated aquarium filter, and more particularly to a submerged aquarium filter that is provided with an indicator to signal the amount of water flow through the filtering medium so that the user may adjust the air flow and maximize water flow. The indicator also signals the clogging of the filter medium.

Filters that may be utilized in fish tanks and aquariums or the like generally are provided with a housing in which is contained a filtering assembly and is arranged so that water may pass through the filtering assembly to be cleansed by the latter. Generally, the water flows into the housing through suitably located openings in the latter and air is pumped into the housing from an external source, such as a pump or the like, to urge or draw the water in a preferred direction through the filtering assembly. Thereafter, the water, together with the air injected into the filtering housing, may pass out of the housing to return into the fish tank or aquarium. The more rapidly water moves through the filter, the more rapidly debris will be removed from the aquarium.

The amount of water flowing through the filter varies as a function of the amount of air flow; namely, water flow increases with increasing air flow up to some optimum level of air flow, but if air flow is increased above this optimum level, the resulting turbulence of air mixed with water will decrease the amount of water flow through the filter. The optimum air flow depends both on the shape of the filter housing and on the porosity of the filtering material. Existing air operated, submerged, aquarium filters do not provide the user with means to select an optimum level of air flow. The user commonly provides more or less air than that required for maximum filter effectiveness.

Moreover, as those skilled in the art readily appreciate, the filtering assembly or glass wool will become clogged after extended use as it removes debris and the like from water that passes through the housing and, thus, although the air bubbles leaving the housing may indicate that the air pump is operating, these air bubbles may not necessarily indicate that water is in fact passing through the clogged filtering assembly. For this reason, the housings of such filters are typically comprised of a transparent material so that the filtering is exposed to view.

The filtering material is, furthermore, typically comprised, in part, of some light colored material such as glass or plastic wool or open-cell plastic foam, or the like. The darkening of this material, as it becomes laden with debris, serves as a crude indicator that the filtering material is becoming clogged.

However, as those skilled in the art readily understand, the darkening of the filter material is an unreliable indicator of filter clogging, since the debris laden, but yet unclogged, filtering material is a more effective water purification material than is a completely clean filtering material, in that the debris laden filter material supports a variety of micro-organism, some of which trap fine particles, such as bacteria, from the water and others of which convert noxious organic compounds dissolved in the water into harmless nitrogen and carbon dioxide gas. By relying on the visual appearance of the filtering medium, the user will commonly replace the filtering material too soon or not soon enough for maximum filter effectiveness.

Other disadvantages which are associated with the prior art or conventional filtration devices relate to the typical substantially "cubic" configuration thereof which result, during the course of operation thereof, in a substantial degree of turbulence in the fluid as it passes through the filter, thereby, resulting in, to some degree, pressure drops which reduce the overall effectiveness of the filtration device. Moreover, the conventionally "cubic" type of filtration must often be positioned at the corners of the aquarium, for aesthetic purposes, and this clearly diminishes the number of locations at which the filter may be effectively positioned in the aquarium.

Still another disadvantage of the conventional "cubic" filtration device is the fact that it must often be removed upwardly from the bottom of the aquarium, and because of its flat faces which are associated with one another at angles of 90°, there not being an optimum smooth transition from one face to the next, it is possible, when lifting the filter upwardly, to uproot overhanging foliage growing or supported in the gravel of the aquarium.

It has been determined that still a further disadvantage with filters of any configuration is that they are usually provided with exposed projecting conduit extensions which are small and brittle, and, therefore, of fracturable nature. Obviously, the brittle nature of projecting portions subjects the filter to the possibility of fracture when the projections are used for moving the filter from one location to the next within the aquarium.

SUMMARY OF THE INVENTION

Accordingly, it is an object of the present invention to provide a spherical filtering device that may be aesthetically positioned in an aquarium or the like in any suitable location, and which may be removed without disturbing or uprooting existing foliage or ornaments and the like; the spherical body acting to reduce, to a great extent, internal fluid turbulence.

It is another object of the present invention to provide an aquarium filtering device that includes means for visually indicating the operability of the filter.

It is still another object of the present invention to provide an air-operated filtering device including means for visually indicating when an optimum amount of air is being injected into the filter.

It is still another object of the present invention to provide an aquarium filter having a movable body for visually signalling the passage of contaminated water through the filtering portions thereof.

To this end, the present invention relates to a filtering device comprising a spherical housing, partition means in said spherical housing for defining first and second partially spherical chambers in communicating relation, said spherical housing having at least one opening through which water may enter into said first chamber from an external source, said second chamber including filtering means for cleansing water, said spherical housing acting to optimize volumetric filtration capacity of said second chamber, means directing air into said second chamber for drawing water through said filtering means, means for directing both air and cleansed water out of said second chamber, and indicating means for signalling inflow of water into said first chamber and outflow from the latter into said second chamber, said indicating means being operatively associated with the inflow of water into said first chamber so as to undergo generally continuous movement during the latter said inflow and terminate movement upon termination of the latter said inflow; said indicating means extending in said first chamber between, and in close proximity with, said partition means and a partially spherical internal portion of said housing and, thereby, subjected to a generally near-optimum water impingement rate thereagainst.

BRIEF DESCRIPTION OF THE DRAWINGS

With the above and additional objects and advantages in view as will hereinafter appear, this invention comprises the devices, combinations and arrangements of parts hereinafter described and illustrated in the accompanying drawings of a preferred embodiment in which:

FIG. 7 is an enlarged perspective view of a fluid isolating coupling associated with the filter;

FIG. 8 is a top plan view of the fluid-flow indicator;

FIG. 9 is a front elevational view, partially in cross-section, of the fluid-flow indicator illustrated in FIG. 8; and FIG. 10 is a top plan view of the bottom hemispherical portion associated with the hemispherical top cover portion illustrated in FIG. 5.

DETAILED DESCRIPTION OF THE INVENTION

Figure 1:
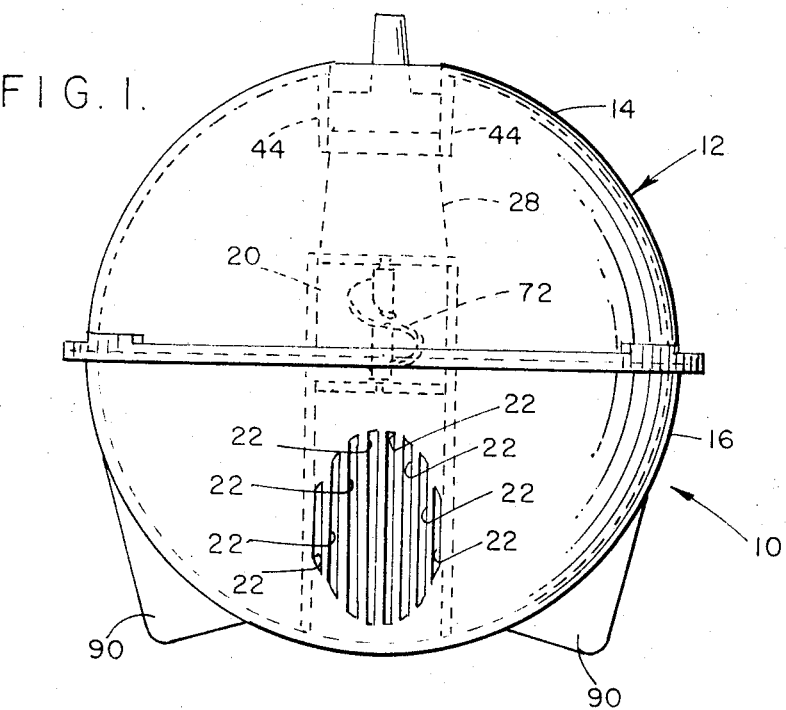
FIG. 1 is a front elevational view of the filtration device pursuant to the present invention, showing certain internal components thereof in phantom.
Figure 2:
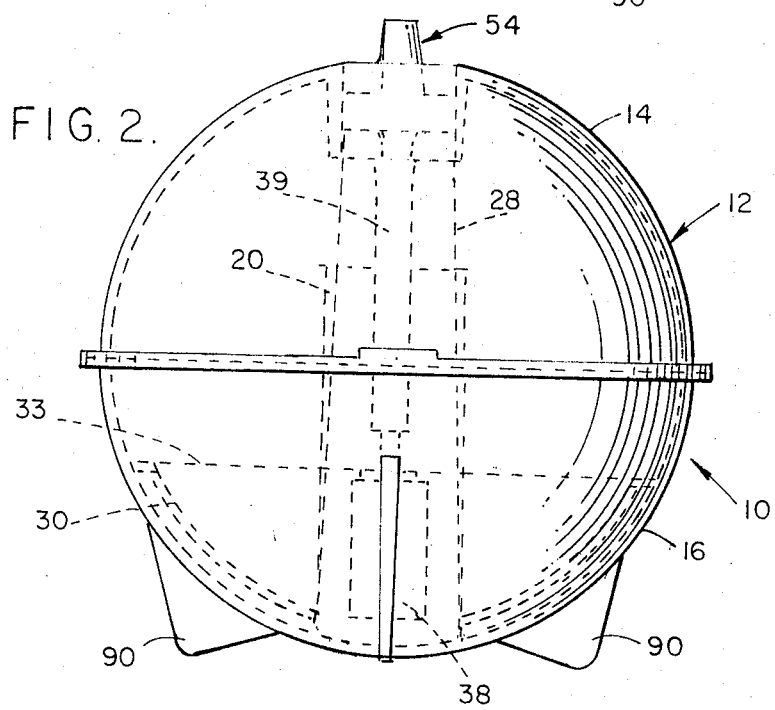
FIG. 2 is a rear elevational view of the structure illustrated in FIG. 1.
Figure 3:
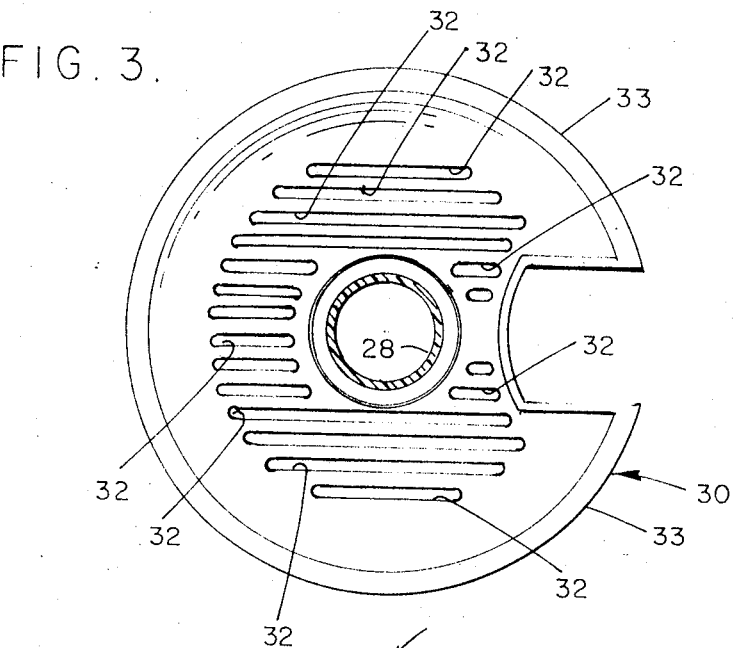
FIG. 3 is a top plan view, partially in cross-section, of the filtering material support arrangement in the filter.
Figure 4:
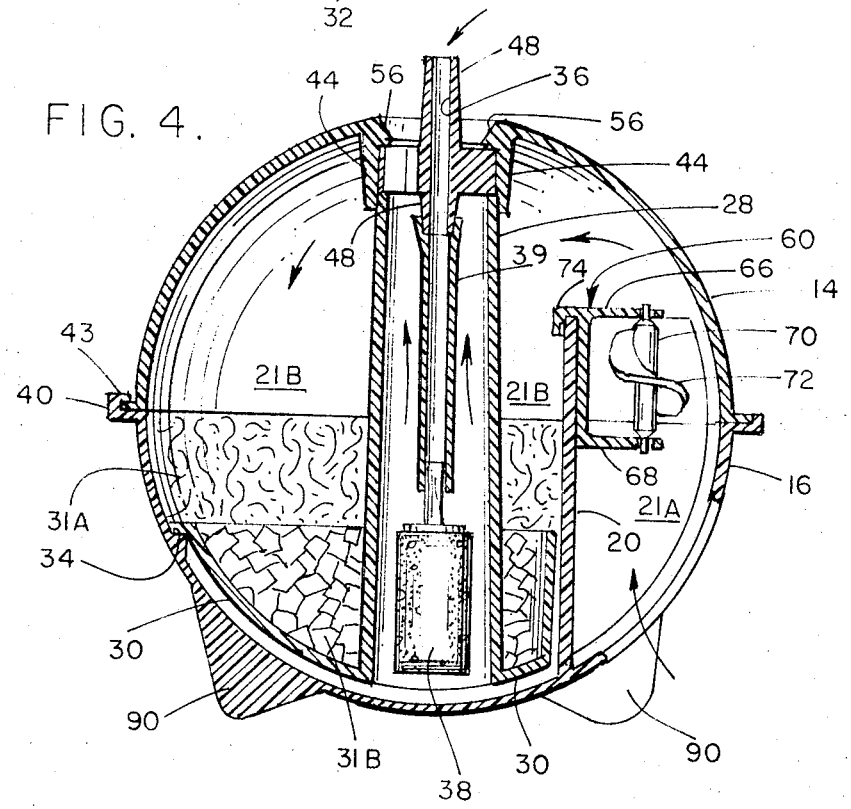
FIG. 4 is a side cross-sectional elevational view of the filter.
Figure 5:
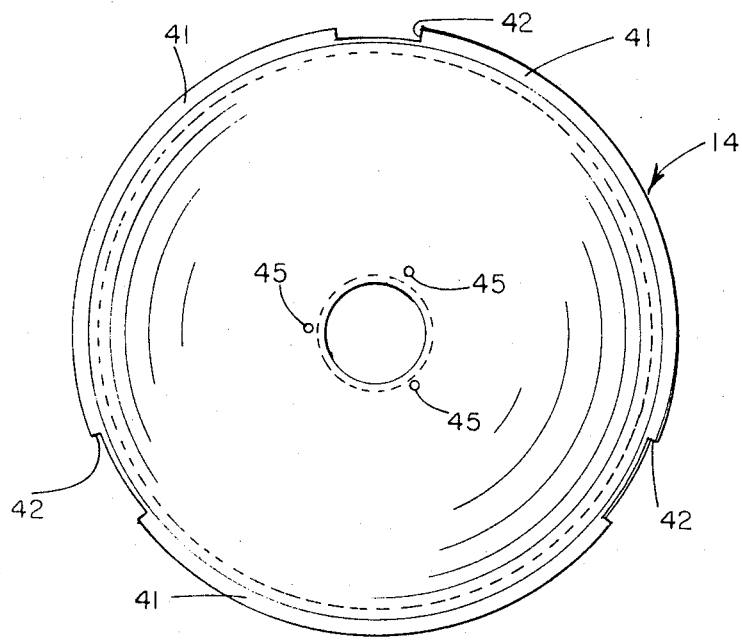
FIG. 5 is a top plan view of the hemispherical top cover of the filter.

Referring now to the drawings and more particularly to FIGS. 1 and 2 thereof, the present invention comprises an aquarium filter generally denoted by the reference character 10. The filter 10 includes a spherical housing 12 defined by a top cover hemispherical portion 14 and a bottom hemispherical portion 16. As illustrated in FIGS. 4 and 10, the bottom portion 16 is provided with a partition 20 which is generally U-shaped in horizontal cross-section and acts to define two communicating chambers 21A and 21B, respectively. Chamber 21A is defined in part by a partially spherical portion of the bottom portion 16 and the concavity of partition 20, whereas the chamber 21B is defined in part by a larger partially spherical portion of the bottom portion 16 and the convexity of partition 20. As illustrated most clearly in FIG. 1, the bottom portion 16 is provided with a plurality of elongate water-intake slots 22 having a somewhat elliptical border.

Continuing, with reference to FIG. 4, the aquarium filter 10, pursuant to the present invention, further comprises an elongate annular conduit 28 which is generally tapered in cross-section and has a pair of opposite open ends. A cup-shaped platform 30, having a plurality of slotted openings 32 therein, is fixedly connected to, or is integral with, elongate annular conduit 28 at the lower open end thereof and extends generally transversely thereto. The platform 30 has a generally annular transverse rim 33 which rests on a generally internal annular ledge 34 which is provided in the bottom portion 16 of the housing 12. The platform 30 may be fit into the housing 12 until the annular rim 33 of the platform 30 contacts the ledge 34, the latter which acts to provide a generally uniform clearance or define a third chamber between the platform 30 and the bottom portion 16 of the housing 12, which third chamber communicates with the conduit 28 and the second chamber 21B through the intermediary of the slotted openings 32 provided in the platform 30.

The platform 30, internally of the chamber 21B, acts to support a filtering assembly such as glass or plastic wool 31A, and charcoal 31B and the like and, thus, the second chamber 21B may be characterized as a filtering or cleansing chamber through which contaminated water may pass to be decontaminated thereby.

An air-isolating inlet channel 36 is provided for directing air into the elongate annular conduit 28 and communicates, at an exposed end thereof, with a pump (not shown in the drawings), and the other end, with an air permeable element 38 acting to disperse incoming air throughout the elongate annular conduit 28, through the intermediary of a tube 39. The function of the air inlet channel 36 and air permeable element 38 will be further clarified below.

The housing 12 is provided such that the top cover portion 14 may be detachably associated with the bottom portion 16. In this respect, the bottom portion 16 is provided with a plurality of ear-like exterior flanges 40, spaced peripherally relative to one another, whereas the cover portion 14 is provided with an external annular ridge 41 having spaced notches 42 therein corresponding to the spacing between the flanges 40 for receiving the latter respectively. Thus, the top and bottom hemispherical portions 14 and 16 may be detachably connected to one another such that the flanges 40 are first inserted through the notches 42 and thereafter, by turning the top and bottom portion 14 and 16 relative to one another, a transverse lip 43 of the flanges 40 will overlie the ridge 41 in tight-fit relation.

The top cover portion 14 is, furthermore, provided with a cylindrically depressed wall defining an opening 44 which surrounds the uppermost portion of the elongate annular conduit 28 so that air and cleansed or decontaminated water may be expelled from the aquarium filter 10. The cover portion 14 is also provided with air-vent openings 45 so that, when the aquarium filter 10 is initially disposed into the aquarium, water may readily enter into the filter 10 through the slotted openings 22 therein and air existing in the aquarium filter 10 may be readily expelled through the air vents 45 and, thus, will not present any obstacle to the inflow of water through the slotted openings 22.

The air inlet channel 36 extends in a pair of oppositely extending co-axial conduits 48 formed as part of a hub which is intergrally interconnected to an annular rim 50 through the intermediary of three radially extending ribs 52 respectively. The arrangement of the oppositely extending conduits 48, which are endwise tapered slightly, the annular rim 50, and the ribs 52 interconnecting the rim 50 and conduits 48 to one another as an integral flexible composite unit 54, may be detachably constrained in the opening 44 defined by the cylindrically depressed wall in the top cover portion 14 in a manner as illustrated in FIG. 4. In this respect, the opening 44 is provided with an annular upper ledge 56 against which the upper face portion of the annular rim 50 is engageable so as to prevent inadvertent axial separation of the unit 54 from the top cover portion 14 as the unit 54 is lifted upwardly to permit removal of the filter 10 from the aquarium. Clearly, insertion of the unit 54 into the opening 44 of the top cover portion 14 is effected by positioning the unit 54 upwardly from the interior of the top cover portion 14 into engagement with the annular ledge 56 in the opening 44.

The significance of making the unit 54 so as to be yieldable or resilient and constituted preferably of polyethelyne or polypropolene or the like, permits similarly constituted soft tubing to be readily attached and detached from the exposed uppermost conduit 48, which tubing is connected in a conventional manner to a pump or air-supplying source. It has been determined that the conduit 48 is a source of possible fracture in the absence of being elastomeric or resilient and thus, the yieldable nature thereof is a significant preventative of breakage at an especially potentially fracturable location. Moreover, since the air supplying tubing is often connected and disconnected from the upper exposed conduit 48 of the unit 54, the tubing and conduit should be prevented from self-welding together, in a manner as often occurs with soft plastic in contact with rigid plastic for a prolonged period, this resulting in a migration of the flexible plastic substance into the rigid plastic substance and a self-welding to one another. The provision of two resiliently constituted similar plastics for detachable association with one another diminishes this migration and, thereby, prevents the self-welding to one another and permits detachment when necessary.

The aquarium filter 10, as indicated above, is provided with indicating means for signalling its operability. The indicating means acts to provide a visual signal to an observer that water is flowing into the chamber 21A through the intermediary of the slotted openings 22. In this respect, there is provided an insert-type of indicator denoted by the reference character 60 in FIGS. 4, 8 and 9.

The insert-type indicator 60 is provided with forwardly extending upper and lower flanges 66 and 68 respectively, between which flanges is interposed in a freely journaled fashion, a rotary shaft 70. Fixedly mounted on the rotary shaft 70, for rotation therewith, is a generally helically extending impeller 72. Moreover, the indicator 60 is provided with a shouldered down-turned rear flange 74 which extends from a vertical rear wall 76 in generally spaced relation with the latter.

The indicator 60 may be mounted upon or slipped onto the partition 20 of the housing 12 in a manner illustrated in FIG. 4, by removing the cover portion 14 from the housing 12. Thus, because of the provision of the shouldered down-turned rear flange 74, the latter may detachably overlie the uppermost edge portion of the partition 20 and, thereby, support the indicator 60 so as to extend in the chamber 21A. Moreover, the shouldered down-turned rear flange 74 and the vertical rear wall 76 are each of arcuate extent, in horizontal cross-section (not shown), for receiving therebetween the arcuate extent of the partition 20. This relationship of the mutual arcuate extents of the flange 74, vertical rear wall 76 and partition 20 resists inadvertent pivotal displacement or pivotal uplift of the indicator 60 relative to the partition 20 at the extreme top-edge of the partition 20, during the operation of the filter 10.

In operation, the aquarium filter 10 is disposed internally of an aquarium so that water in an aquarium may readily enter into the housing 12 while excess air initially in the housing 12 is expelled through the air-vents 45. Water may also readily flow into the chamber 21A through the slotted openings 22 without obstacle thereto. The inflow of water into the chamber 21A, as indicated by the arrows in FIG. 4, will act upon the impeller 72 and due to the helical nature of the latter, the upflow of water from chamber 21A and downflow from the latter into chamber 21B will cause the rotary shaft 70 to rotate. Clearly, the rotation of the shaft 70 and impeller 72 thereon may be utilized for indicating the passage of water through the filter 10, as the top and bottom hemispherical portions thereof are generally constituted of transparent plastic to permit observation of the rotating impeller 72.

As those skilled in the art readily understand, the air tubing supplying air to the air channel 36 is, typically, in series with an adjustable air valve (not shown), which can be employed to increase or decrease the amount of air entering the elongate annular conduit 28. By observing the impeller 72, while increasing and decreasing the amount of air, the user may optimize air flow by selecting that air flow which maximizes the rate of rotation of the impeller 72.

Furthermore, as those skilled in the art readily understand, the filtering material or glass wool and charcoal which are contained internally of the chamber 21B become clogged after a period of time and, thus, upon becoming clogged, the latter obstructs the flow of water and must be replaced to maintain the aquarium in which the aquarium filter 10 is disposed in a cleansed condition. Thus, notwithstanding the fact that the pump is operating as may be indicated by the air bubbles which ascend in the elongate annular conduit 28, the filtering device 10 may be clogged and, therefore, inoperable, which inoperability may not be necessarily easily or readily observable.

In this instance, as the filtering materials have become clogged, the operating condition of water passing through the filtering device 10 will decrease and finally terminate and clearly, the extent of water inflow into the chamber 21A will, thereby, likewise decrease and terminate. As those skilled in the art will readily understand, a termination of water inflow into chamber 21A prevents the filtering device 10 from further cleansing contaminated water and is, therefore, useless unless the filtering materials as clogged are replaced.

Obviously, as the rate of water inflow into chamber 21A decreases, the rate of rotation of the impeller 72 will decrease. Once there is a sufficient decrease of water inflow into chamber 21A, the impeller 72 cannot respond and rotate. Thus, when the hobbyist notices that the impeller 72 has significantly slowed, or is not in a condition of rotation, this will indicate that the filtering materials require replacement because of their clogged condition.

Therefore, the impeller 72 acts as an indicator for signalling the operability and degree of operability of the filtering device 10, when in a condition of rotation, and relative or complete inoperability of the filtering device 10, or the clogged nature of the filtering materials, when its rate of rotation slows or terminates.

In the normal course of operation, water will then, after being decontaminated in the chamber 21B, flow into the elongate annular conduit 28 through the openings 32 provided in the platform 30 and will, together with some air, be expelled from the conduit 28 at the uppermost open end of the latter through the spacing between the rim 50 and conduits 48 of the unit 54. The inflow of water into the housing 12 will traverse the aforementioned path because of the injection of air into the elongate annular conduit 28 through the intermediary of the air inlet conduit 36 and the air-permeable member 38. Thus, the pressurized air which is injected into the annular conduit 28 causes the continuous inflow of water into the housing 12 to be cleansed by the latter and expelled therefrom together with the pressurized air through the upper opening in the annular conduit 28.

Figure 6:
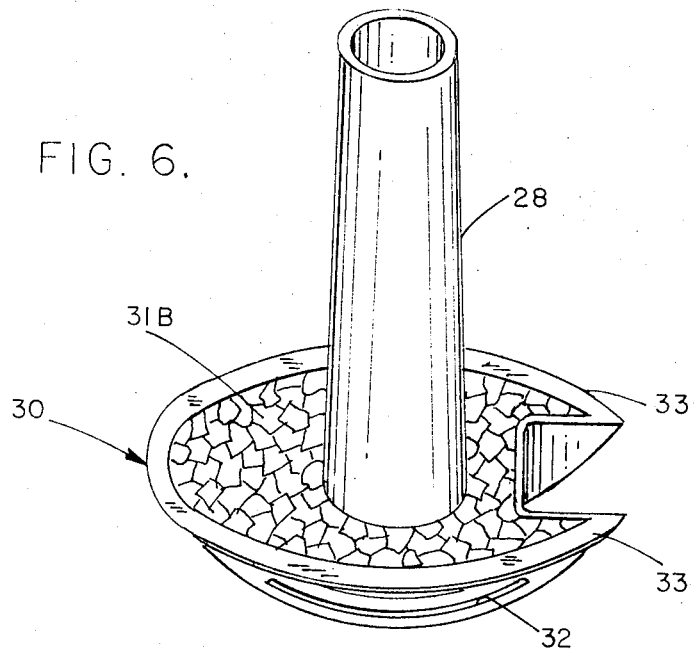
FIG. 6 is a perspective view of the filtering material support illustrated in FIG. 3.

It is interesting to point out that the platform 30 is generally cup-shaped and thereby may retain a significant quantity of charcoal 31B in a manner as illustrated in FIGS. 4 and 6 up to the annular upper rim 33 thereof. Accordingly, when it is necessary to replace the charcoal 31B and the glass wool 31A overlying the charcoal 31B, all that is necessary is to detach the top of the bottom hemispherical portions 14 and 16 from one another and withdraw the annular conduit 28 and, thereby, the cup-shaped platform 30 out of the confines of the bottom portion 16. In this manner, the charcoal will be prevented from spilling outwardly because of the cup-shaped nature of the platform 30 and, thus, replacement of the charcoal and glass wool may be effected cleanly.

It is also interesting to point out that the longitudinal extent or height of the partition 20 is substantially higher than the horizontal center line so as to retain the indicator 60 at a rather high level in the spherical filter 10 for clarity and observation thereof. Moreover, the height of the partition 20 also permits the disposition of a great quantity of filtering materials such as the glass wool 31A in the spherical filter 10 and acts to prevent the filtering materials from penetrating the first chamber 21A in which the indicator 60 is confined so as not to obstruct observation of the latter. As may be appreciated by referring to FIG. 10, the partition 20 is generally U-shaped in transverse cross-section so as to form a laterally complete enclosure with a partially spherical inner portion of the bottom hemispherical portion 16 and generally contact or abut vertically against in flush relation a partially spherical inner portion of the top cover portion 14, thereby defining the chamber 21A.

As illustrated in FIGS. 1, 2, and 4, the bottom hemispherical portion 16 is provided with a tripod array of three leg-like flanges 90 respectively upon which the spherical housing 12 may rest in an upright condition within the aquarium and provide sufficient spacing between the aquarium bottom and the external surface of the bottom hemispherical portion 16 to enhance water movement therebetween and obviate water stagnation below the filter 10.

It should be pointed out that there is an added significance to the provision of a spherical housing for the filtration device 10 in that as water passes from chamber 21A into chamber 21B, the extent of turbulence originally associated with conventional filtration devices, in the water, is diminished because of the generally smooth transition of the spherical interior of the filter 10. Moreover, because of the proximity of the partition 20 with that of the spherical interior of the filter 10, the impeller 72 is subjected to a generally near-optimum water impingement rate thereagainst so as to most effectively sense the rate of water flow throughout the filtration device 10.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An aquarium filtering device in combination with an aquarium tank having contaminated and decontaminated water therein, said filtering device comprising a spherical housing, said housing including a top cover hemispherical portion detachably associated with a bottom hemispherical portion, said bottom portion being provided with a vertically arranged partition to define a first inlet chamber in fluid flow relation with the aquarium tank and a second filtration chamber in fluid flow relation with said first inlet chamber, said first inlet chamber being provided with inlet means in a wall of said bottom portion through which contaminated water from the aquarium tank may flow, an assembly including a cup-shaped platform and a vertically extending annular conduit, said cup-shaped platform being disposed in said bottom portion with an open side directed toward said top cover portion, said cup-shaped platform being spaced above a bottom wall of said bottom portion, said conduit being arranged with a lower portion centrally disposed in said bottom portion within said open side of said cup-shaped platform, said conduit being associated with an aperture in said cup-shaped platform for fluid communication between said conduit and the space between said cup-shaped platform and said bottom wall, an upper portion of said conduit extending to a centrally located outlet opening in said top cover portion, said assembly being located within said second filtration chamber to define a third outlet chamber distinct from said second filtration chamber, said cup-shaped platform being provided with a plurality of wall openings through said open side for communicating said second filtration chamber in fluid flow relation with said third outlet chamber, said cup-shaped platform containing a mass of filtering material therein, said conduit being provided with opening means for ingress of air into said third outlet chamber and egress of decontaminated water out of said third outlet chamber into the aquarium tank, air stream supply means disposed in said third outlet chamber which directs ingressed air from said opening means into said third outlet chamber thereby causing contaminated water from the aquarium tank to flow through said inlet means into said first inlet chamber and therefrom into said second filtration chamber where the contaminated water is substantially decontaminated by the filtering material before flowing into said third outlet chamber and being egressed through said opening means into the aquarium tank.

2. A filtering device as claimed in claim 1 including indicating means disposed in said first inlet chamber and responsive to flow of water from said inlet means to said second filtration chamber for signalling flow of the contaminated water through the filtering material, whereby said indicating means alternatively indicates retardation of flow through the filtering material when the filtering material is clogged.

3. A filtering device as claimed in claim 1 wherein said partition is arcuate and spaced from said top cover portion for permitting water to flow from said first inlet chamber to said second filtration chamber.

4. A filtering device as claimed in claim 1 wherein flange means detachably connect said top cover portion to said bottom portion.

5. A filtering device as claimed in claim 1 wherein said bottom portion is provided with a tripod array of three leg-like flanges upon which said spherical housing rests in an upright position within the aquarium tank.

6. A filtering device as claimed in claim 2 wherein said indicating means includes rotary means for visually signalling water inflow.

7. A filtering device as claimed in claim 6 wherein said indicating means includes impeller means extending in said first inlet chamber and supported for rotation in the latter upon inflow of water into said first inlet chamber and outflow from the latter into said second filtration chamber.

8. A filtering device as claimed in claim 7 wherein said impeller means includes a rotary shaft and at least one helical impeller projecting laterally from said shaft.

9. A filtering device as claimed in claim 2 wherein said indicating means and said partition include interfitting members which are operatively associated with one another in detachable slip-on relation, said indicating means including a down-turned flange portion for overlying and resting freely on an associated interfitting member of said partition means.

10. A filtering device as claimed in claim 1 wherein a portion of said housing is constituted of opaque material for concealing said filtering means.

* * * * *